United States Patent [19]

MacNeill

[11] 3,848,228

[45] Nov. 12, 1974

[54] VISUAL DISPLAY OF UNRECOGNIZABLE CHARACTERS IN OPTICAL CHARACTER RECOGNITION MACHINES

[75] Inventor: John H. MacNeill, Indialantic, Fla.

[73] Assignee: Optical Business Machines, Inc., Melbourne, Fla.

[22] Filed: June 7, 1973

[21] Appl. No.: 367,880

[52] U.S. Cl. .......................................... 340/146.3 F
[51] Int. Cl. .......................................... G06k 9/02
[58] Field of Search. 340/146.3 F, 146.3 P, 146.3 T

[56] References Cited

UNITED STATES PATENTS 3,366,926 1/1968 Silsby et al. .................. 340/146.3 F
3,457,422 7/1969 Rottmann .................... 340/146.3 F

*Primary Examiner*—Gareth D. Shaw
*Assistant Examiner*—Joseph M. Thesz, Jr.
*Attorney, Agent, or Firm*—Rose & Edell

[57] ABSTRACT

A selectively operable optical path is provided to permit visual display of a character that cannot be recognized by an optical character recognition machine. Visual display of such characters permits visual observation of the enlarged character by an operator who, if he recognizes the character can insert it by a keyboard mechanism and if he cannot recognize it he may reject the document as unintelligible.

7 Claims, 1 Drawing Figure

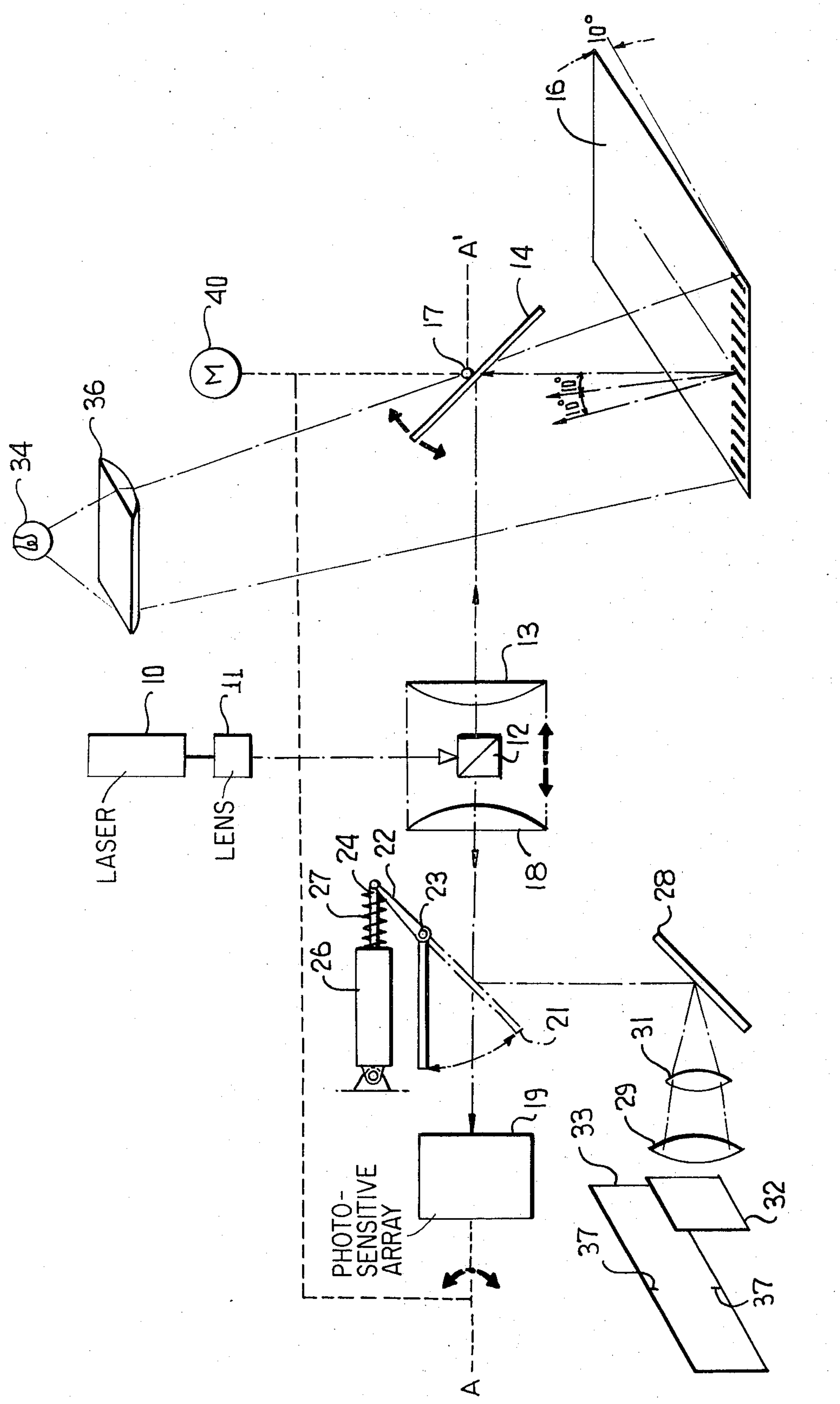
LASER
LENS
PHOTO-SENSITIVE ARRAY
M
A
A'
10°
10
11
12
13
14
16
17
18
19
21
22
23
24
26
27
28
29
31
32
33
34
36
37
40

VISUAL DISPLAY OF UNRECOGNIZABLE CHARACTERS IN OPTICAL CHARACTER RECOGNITION MACHINES

RELATED APPLICATIONS

This application is related to an application filed on Mar. 8, 1972, in the names of John H. MacNeill and Ronald R. Willey for Improved Optical Scan Arrangement For Optical Character Recognition Systems, now U.S. Pat. No. 3,812,459, issued May 21, 1974 and an application filed on concurrent date herewith in the names of Thomas G. Holmes, Harrison B. Lidkea and Kenneth L. Seib for Optical Character Recognition System and assigned Ser. No. 367,881. Both applications are assigned to the same assignee as the present invention.

BACKGROUND OF THE INVENTION

The present invention relates to optical systems employed in optical character recognition systems and more particularly to apparatus associated with said optics permitting the visual display on a screen of characters which the optical character recognition system cannot recognize.

The aforesaid copending patent application Ser. No. 232,893 now U.S. Pat. No. 3,812,459 discloses an optical system for character recognition machines in which a single path is employed for both illuminating and projecting individual elements of the characters on arrayed photosensitive elements at which the electronic recognition processing commences. Specifically, a low power laser beam of elongated eliptical cross section is projected by a prism through a lens system to a scanning mirror. The scanning mirror sweeps the laser beam across each successive line of characters presented for recognition and the light reflected from the characters is reflected back to the scanning mirror which directs the light to the aforesaid photosensitive elements.

In the aforesaid copending application filed on concurrent date herewith there is disclosed the logic circuitry for interpreting the information projected by the optical system onto the photosensitive array. In such systems there is provided an error halt mode of operation which is automatically initiated when the machine is unable to recognize a character presented thereto for recognition. In this mode of operation the scanning mirror is positioned so the light from the laser falls on the character which cannot be recognized so that the operator, if one is present, may look at the character and attempt to interpret the information. A keyboard is provided so that if the operator recognizes the character he may enter it into the system by striking the appropriate key on the keyboard. Since a laser source is utilized in the aforesaid optical system of the prior application it is not appropriate for the operator to view the character directly.

It is an object of the present invention to provide a visual display of an unrecognized character which may be safely viewed by the operator.

It is another object of the present invention to provide a visual display of an unrecognized character in enlarged format and at a location which is safe and convenient for an operator to view.

It is still another object of the present invention to provide a relatively simple mechanism for visually displaying an unrecognized character in an optical recognition machine which may be readily and safely viewed by the operator.

SUMMARY OF THE INVENTION

In accordance with the principles of the present invention a pivotally mounted mirror is provided which upon energization of a suitably connected solenoid is inserted into the optical path of the optical system disclosed in the aforesaid patent application 232,893 now U.S. Pat. No. 3,812,459 at a location just forward of the photosensitive elements. At this location the optical path carries the image of the material on the document to be read and the mirror reflects this image into an alternate optical path which projects the image onto a viewing screen. Actuation of the solenoid occurs during the error halt mode set forth in the aforesaid application filed on concurrent date herewith. Concurrently with the energization of the aforesaid solenoid a lamp is energized to project light onto the document which is being analyzed. The optical system associated with the solenoid actuated mirror includes a red blocking filter so that only the illumination provided by the lamp may proceed through the auxiliary optical system and the light from the laser is blocked thereby insuring that when the operator views the projected image his eyes are not damaged by the light from the laser. Since the scanning mirror is positioned such that the image of the unrecognized character is directed via the scanning mirror through the primary optical system the unrecognized character and a few adjacent characters are projected on the operator's viewing screen.

BRIEF DESCRIPTION OF THE DRAWING

The above and still further objects, features and advantages of the present invention will become apparent upon consideration of the following detailed description of one specific embodiment thereof, especially when taken in conjunction with the accompanying drawing wherein:

The single FIGURE of the accompanying drawing is a schematic diagram of an optical arrangement according to the present invention.

DESCRIPTION OF THE PREFERRED EMBODIMENT

Referring specifically to the single FIGURE of the accompanying drawing reference is initially made to the elements disclosed in the aforesaid application 232,893. The aforesaid system includes a low power laser 10 for emitting a well defined light beam which is passed through a lens system 11 to reconfigure the generally circular beam cross section emitted by the laser into an elongated eliptical configuration. The eliptical beam impinges upon a prism 12 where it is reflected to travel along an optical axis A–A'. The beam reflected by the prism passes through a condensing lens 13 toward a scanning mirror 14 which deflects the beam towards a document page 16 from which characters are to be read.

The mirror 14 includes a flat reflecting surface which is caused to rotate about an axis 17 oriented perpendicular to axis A–A' and extending into the plane of the drawing. A scan drive motor 40 is utilized to cause the mirror 14 to rotate about the axis 17 and cause the laser beam to be scanned across the document 16 generally perpendicular to the major axis of the document.

Scanning is effected one line at a time and when a line has been examined and all characters recognized that are to be recognized the document is advanced by means disclosed in the aforesaid application filed on concurrent date herewith so that a second or another line of characters is presented to the optical system for scanning and subsequent recognition.

As each character element on the document page is illuminated its reflection is projected by mirror 14 back through lens 13 a further lens 18 and onto a surface of a linear array 19 of photosensitive elements. The lenses 13 and 18 are both identical lenses positioned back-to-back to provide a focused image at the photosensitive array. The prism 12 is disposed between lenses 13 and 18 and may be secured directly to lens 13 or otherwise supported between the lenses. The prism 12 intercepts an insignificantly small portion of the reflected image because the prism is small relative to the lenses 13 and 18 and it is located in the parallel field between the lenses where the reflected character image is relatively dispersed.

The photosensitive array 19 produces a pattern of electronic signals corresponding to light and dark regions projected onto the array from the optical system; the dark regions indicating the presence of an element of a character in the slice being examined at that moment by the optical system or more particularly by the laser beam. The signal pattern thus produced is assembled in a processer with other patterns which in the aggregate represent an entire character, the processer being described in the aforesaid application being filed on concurrent date herewith. The complete character thus assembled if recognizable produces an output signal from the apparatus indicative of the particular character on the document 16 currently under investigation.

As described in the aforesaid copending application 232,893 certain elements of the system are mechanically moved during the scanning process to compensate for certain optical problems that might otherwise develop in the system. Specifically the lens 13 is translated along the axis A–A′ to maintain the image in focus on the array 19 even though the length of the optical path from the mirror 14 to the document and back to the mirror increases and decreases respectvely as the beam is scanned over the document from the outer edge to the center. Also the array 19 must be rotated to accomodate skew of the image as a result of the fact that the document 16 is tilted at 10° relative to the horizontal to correct certain reflective light problems that might otherwise be encountered. Although the above is described in the aforesaid application it is mentioned here for purposes of completeness of description.

Referring now to those elements of the drawing which relate to the improvements of the present invention, there is provided a mirror 21 mounted on a bell crank 22 pivoted about an axis 23 perpendicular to the optical axis A–A′ and perpendicular with the pivot 17 of the mirror 14. Normally the mirror 21 lies above and generally parallel to the optical axis A–A′ and out of the path of the image projected on the array 19. An end of the bell crank 22 remote from the mirror 21 is connected to a plunger 24 of a display mirror solenoid 26. A spring 27 biases the mirror into the position illustrated in the FIGURE in the solid line position.

Upon energization of the display mirror solenoid 26, the plunger 24 is retracted and the mirror 21 is pivoted into the dashed line position illustrated in the drawing so as to intercept the optical path between the lens 18 and the array 19. The optical information carried in the optical path is diverted so as to be directed to a fixed mirror 28 lying below the optical axis A–A′. The image reflected from the mirror 28 proceeds through a telescope diagrammatically indicated by lenses 29 and 31 and thence passes through a red blocking filter 32 and then onto a rear projection viewing screen 33. Thus when the display mirror solenoid 26 is energized the information under investigation on the document 16 is projected onto the rear projection screen 33 where it may be readily viewed by the operator.

Concurrently with energization of the display mirror solenoid 26 a lamp 34 is also energized and in conjunction with the cylindrical lens system 36 projects light, which may be typically white light, onto the document 16. The light projected onto the document 16 from the lamp 34 encompases an entire line of information so that there is no necessity for this part of the system to be programmed to illuminate only an unrecognized character. Selection of the unrecognized character is made by the system of the aforesaid application filed on concurrent date herewith and is selected by appropriate positioning of the mirror 14. The illumination from the source 34 is reflected from the document 16 concurrently with the light from the laser source 10 and is reflected back through the mirrors 13 and 18 towards the array 19. When the mirror 21 is in its dashed line or active position light from both the laser 10 and the lamp 34 is intercepted and projected through the optical system comprising the elements 28, 29, 31 and 32. The light from the laser source is intercepted by the red blocking filter 32 and thus does not proceed to the projection screen 33 thereby insuring that the operator's eyes are not injured by the intense light of the laser.

Although any convenient circuit may be used for energizing the display mirror solenoid 26 and the lamp 34, the system employed in the total system represented by the aforesaid two pending applications and the present application utilize the display mirror solenoid 8721 and the projection lamp 8730 of FIG. **87*b* of the aforesaid copending application filed concurrently herewith. The signals necessary to energize these elements are generated during an error halt mode of operation of the system described in the aforesaid application filed on concurrent date and occur only when there is an unrecognized character and an operator is present so that the error halt mode has been activated in the system. The operator, when the signal or the character is displayed on the projection screen, may either insert the character through the keyboard mechanism illustrated in and described relative to FIG. 80. If the character is not recognizable the operator may reject the document by utilizing controls illustrated in FIG. 86*a*** of the aforesaid application filed on concurrent date herewith and described in conjunction with said Figures.

The indicia 37 on the viewing screen 33 are provided to indicate to the operator the unrecognizable character. When the mirror 14 is stopped in the error halt mode of the aforesaid machine the mirror 14 is in a position such that the unrecognized character is displayed between the indicia 37. It will be noted that the length of the viewing screen is quite large so that a large portion of the line in which such character is arranged is displayed. This arrangement permits the operator to determine the sense of the information in the event the character is unrecognizable to him.

It can be seen from the above that a relatively simple, safe and highly effective method is provided for visually displaying unrecognized characters in an optical recognition system so that the information may be readily interpreted by the operator in attendance of this system.

It is to be understood that the system of the present invention may be employed in other optical systems which provide at least partially independent projection and reading optical paths in optical character recognition machines. Further, the specific array of elements is not critical and any array of elements permitting selective, safe and enlarged display of an unrecognized character may be employed.

While I have described and illustrated one specific embodiment of my invention, it will be clear that variations of the details of construction which are specifically illustrated and described may be resorted to without departing from the true spirit and scope of the invention as defined in the appended claims.

I claim:

1. In an optical character recognition system intended to recognize characters arranged in at least one row by sequentially examining successive characters and including a source of a beam of light, means for projecting the beam of light onto characters to be recognized and including further means for causing the beam of light to sweep sequentially across the characters in a row, optical image sensing means, means including said further means for directing light reflected from such characters along an optical path to said sensing means, a viewing system characterized by,
- a second optical path including means selectively operable to divert light directed toward the sensing means into said second optical path,
- a viewing screen,
- said second optical path focusing said diverted light on said viewing screen, and
- a further source of light for illuminating the characters in a row when light is diverted into said second optical path.

2. The combination according to claim 1 wherein said second optical path further includes means for filtering out the light from the source of a beam of light.

3. The combination according to claim 1 wherein said further means comprises light diverting means selectively movable into the first mentioned optical path.

4. In an optical character recognition machine intended to read plural characters arranged in at least one row extending along the width of a document by sequentially examining successive vertical slices of each character and including a source of a light beam, means for projecting the light beam along a first optical path extending between the source and the characters to be read, the first optical path including a scanning mirror positioned to reflect the light beam onto said character, means for rotating the scanning mirror about an axis to sweep the light beam to illuminate successively characters in a row, optical images sensing means, a second optical path extending from the characters to the sensing means and including the first optical path, the second optical path extending beyond the first optical path, a viewing system characterized by
- a third optical path including further means for changing the direction of light mounted for movement between two positions,
- selectively energizable means for normally maintaining said further means out of said second optical path and upon a change in its energization selectively moving said further means into the second optical path in the region extending beyond the first optical path,
- a viewing screen,
- a second source of light,
- means for directing the light from said second source on the row of characters containing a character to be displayed during the interval said further means is disposed in the second optical path,
- said third optical path including means for projecting an enlarged image of such character on said viewing screen.

5. The combination according to claim 4 wherein said third optical path further includes a filter for light from the source of a light beam whereby to reduce materially the intensity of such light illuminating said viewing screen.

6. The combination according to claim 4 wherein said viewing screen includes indicia indicating the position of the character displayed on said screen scree that is to be read when the scanning mirror is stopped in a position to direct the light beam on such character.

7. In an optical character recognition machine intended to read plural characters arranged in at least one line extending along the width of a flat document by examining successive vertical slices of each character sequentially and including a source of a light beam, means for projecting the light beam along a first optical path extending between the source and the characters to be recognized, the first optical path including a scanning mirror positioned to reflect the light beam onto said character, means for rotating the scanning mirror about an axis to sweep the light beam to illuminate successively characters in a row, optical image sensing means, a second optical path extending from the characters to the sensing means and including the first optical path, the second optical path extending beyond the first optical path, a viewing system characterized by
- a third optical path including a further mirror mounted for rotation about an axis,
- selectively energizable means for normally maintaining said further mirror out of said second optical path and upon a change in energization for selectively rotating said further mirror into said second optical path in the region extending beyond the first optical path,
- a viewing screen,
- a normally de-energized second source of light energized concurrently with positioning of said further mirror in said second optical path,
- means for directing the light from said second source on the row of characters containing the character to be recognized,
- said third optical path including means for projecting an enlarged image of the character to be recognized on said viewing screen.

* * * * *